United States Patent [19]

Sootome et al.

[11] Patent Number: 4,875,075

[45] Date of Patent: Oct. 17, 1989

[54] IMAGE READING DEVICE AND IMAGE FORMING APPARATUS HAVING SAME

[75] Inventors: Sumitoshi Sootome, Yachiyo; Morikazu Mizutani, Tokyo; Isao Ikemoto, Kawasaki; Shinji Kanemitsu, Tokyo; Hajime Kitajima; Shigeyoshi Onoda, both of Yokohama, all of Japan

[73] Assignee: Canon Kabushiki Kaisha, Tokyo, Japan

[21] Appl. No.: 61,222

[22] Filed: Jun. 12, 1987

[30] Foreign Application Priority Data

Jul. 4, 1986 [JP] Japan ................................ 61-157510

[51] Int. Cl.[4] ........................ G03B 27/48; G03B 27/50

[52] U.S. Cl. ........................................ 355/50; 355/75; 355/234; 355/235

[58] Field of Search ................. 355/3 R, 3 DR, 8, 75, 355/50, 234, 235

[56] References Cited

U.S. PATENT DOCUMENTS 4,386,841 6/1983 Wakao et al. ................... 355/3 DR
4,395,115 7/1983 Tsuda et al. .......................... 355/75
4,462,677 7/1984 Onoda ............................ 355/3 DR
4,505,574 3/1985 Kurata et al. .......................... 355/8
4,682,884 7/1987 Taniguchi et al. ...................... 355/8

*Primary Examiner*—Monroe H. Hayes
*Attorney, Agent, or Firm*—Fitzpatrick, Cella, Harper & Scinto

[57] ABSTRACT

An image forming apparatus for forming an image of an original using an optical image of the original has: a first assembly; a second assembly cooperable with the first assembly the second assembly being movable relative to the first assembly; between a closed position wherein the apparatus is operable and an open position wherein the apparatus is opened; a reciprocable original supporting member for supporting an original; an optical system, in the second assembly, for forming the image of the original supported on the original supporting member; a second guiding member, on the second assembly, for guiding and positioning the original supporting member adjacent one of the sides of the original support member, wherein the original supporting member is movable to be disengaged from the second guiding member, the second guiding member being contactable with the original supporting member to correctly position the original supporting member with respect to the second assembly when it is engaged with the original supporting member.

38 Claims, 3 Drawing Sheets

IMAGE READING DEVICE AND IMAGE FORMING APPARATUS HAVING SAME

FIELD OF THE INVENTION AND RELATED ART

The present invention relates to an image reading device and an image forming apparatus using the image reading device and is usable with an image reader and a copying apparatus of the like provided with an original supporting platen for supporting an original to be read or copied. More particularly, it relates to a device having means for guiding movement of the original supporting platen.

Recently, image forming machines which can be separate into two or more assemblies to facilitate maintenance operation, servicing, replacement of consumable materials and jam disposal or the like, have come into wide use. For example, U.S. Pat. No. 4,462,677 discloses an assembly accommodating a process cartridge, separable from another assembly at the boundary of a transportation path for a recording medium, which is convenient from various aspects.

In this apparatus, the upper assembly is rotatable about a hinge to be separated from the lower assembly. However, this structure involves disadvantages in that the upper assembly is rotated as a whole together with the original supporting platen so that the assembly to be rotated is bulky and heavy. An additional disadvantage is that when the upper assembly is opened, the original supporting platen and/or an original may fall, since the platen is inclined.

In order to solve the above problems, it has been proposed that the original supporting platen should be the stationary assembly be rotating only a part of the upper part of the apparatus, as disclosed in Japanese Laid-Open Utility Model application 52-54633, U.S. patent application Ser. No. 36,812, filed on Apr. 10, 1987 by Morikazu Mizutani et al., claiming conventional priority from Japanese patent application No. 83932/1986 and U.S.application Ser. No. 38,200 filed on Apr. 14, 1987 by Tadyayuki Tsuda et al., claiming the convention priority from Japanese patent application No. 8608/1986.

However, this structure involves another problem in that the original supporting plate has to be mounted accurately to the stationary assembly, with the result that the positional accuracy between the original supporting plate and the rotatable assembly can not be assured directly. Particularly, the accuracy deteriorates due to wear with use of the apparatus. This problem is more significant when the rotatable assembly contains an image reading optical system, since the positional inaccuracy results in defocusing of the image on the plane on which the image is to be formed. Further, and more particularly, when the reading optical system includes an array of short focus imaging elements, the resulting deterioration of the image is quite significant.

SUMMARY OF THE INVENTION

Accordingly, it is a principle object of the present invention to provide an image reading device and an image forming apparatus having the same wherein the image can be correctly read, even when an original supporting platen and an image reading optical system are mounted in different assemblies and those assemblies are separable.

It is another object of the present invention to provide an image reading device and an image forming apparatus having the same wherein the accuracy of the image reading does not deteriorate with use of the device and the apparatus.

It is a further object of the present invention to provide an image reading device and an image forming apparatus having the same wherein an image formed on an imaging surface such as a photo-sensitive member surface is not disturbed even when an original supporting member and the photosensitive member are mounted on different frames.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Figure 1:
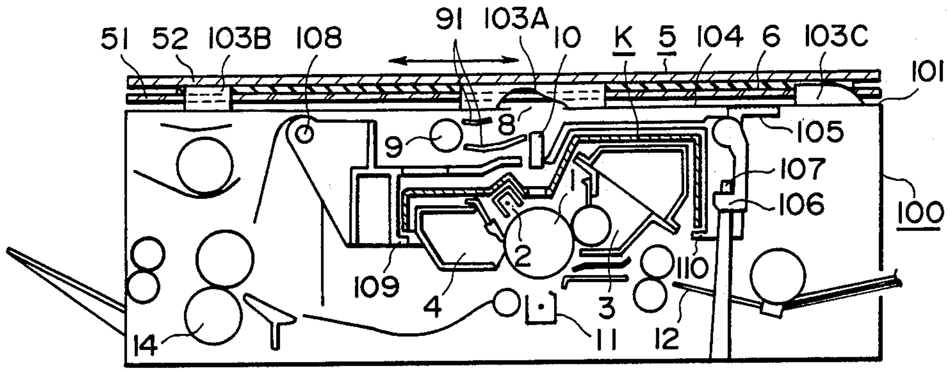
FIG. 1 is a sectional view of an image forming apparatus provided with an image reading device according to an embodiment of the present invention, wherein the apparatus is closed.

The preferred embodiments of the present invention will be described in conjunction with the accompanying drawings, wherein like reference numerals have been used throughout to designate corresponding elements.

Figure 2:
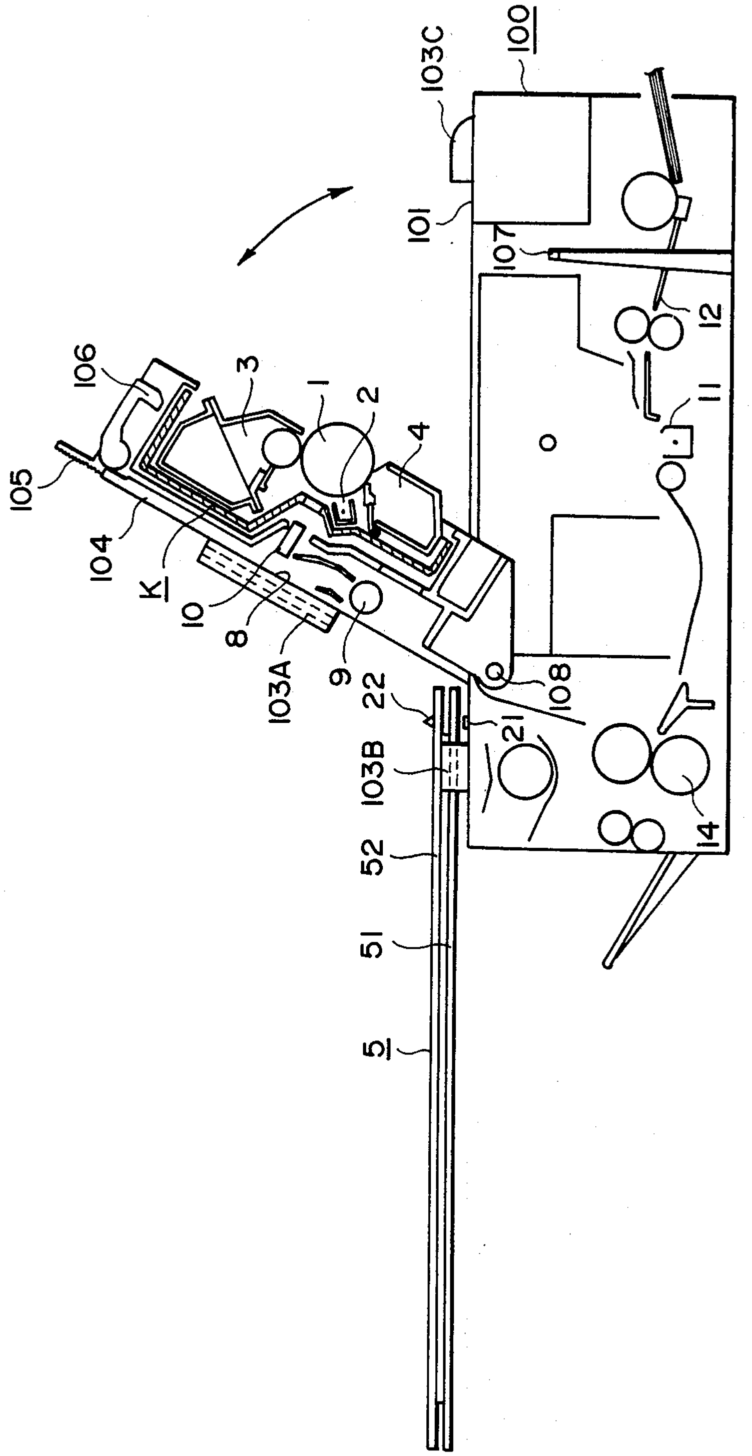
FIG. 2 is a sectional view of the apparatus of FIG. 1, wherein the apparatus is shown as being opened.

Referring to FIGS. 1 and 2, there is shown an image forming apparatus, more particularly, a copying machine, according to an embodiment of the present invention. In FIG. 1, the apparatus is closed, while it is opened in FIG. 2.

Figure 3:
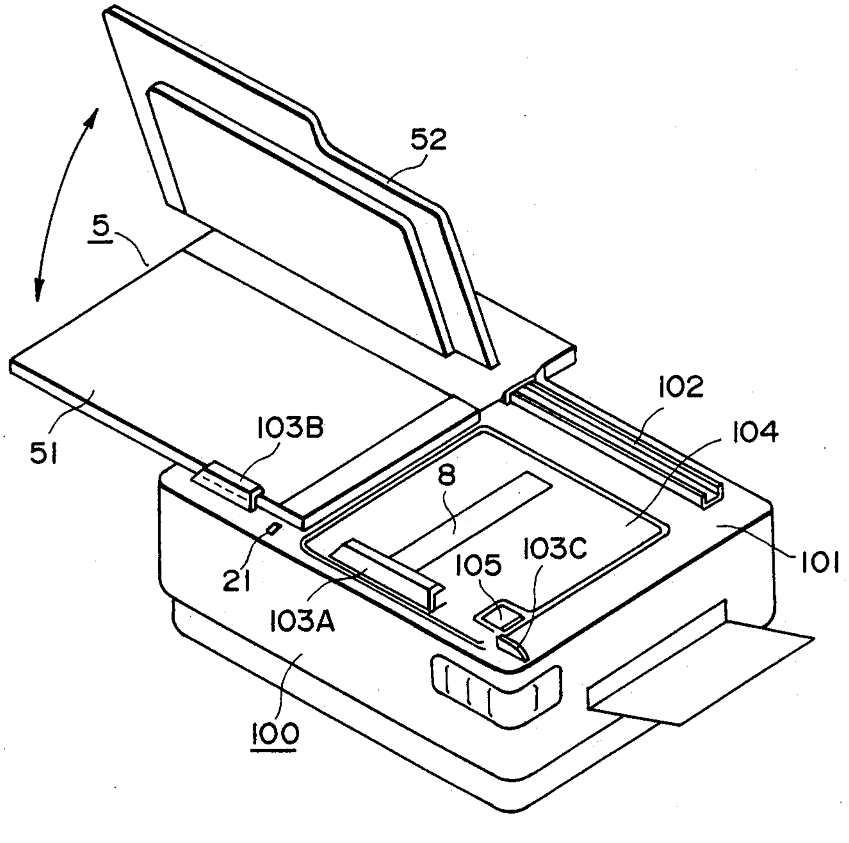
FIG. 3 is a perspective view of the device of FIG. 1.

FIG. 3 is a perspective view of the apparatus shown in FIGS. 1 and 2.

The apparatus comprises a process cartridge K. The process cartridge K contains a rotatable photosensitive drum 1 as an image bearing member having a surface photosensitive layer, a discharger 2 for uniformly charging the photosensitive drum 1 to a predetermined potential of positive or negative polarity, a developing device 3 for developing a latent image formed on the photosensitive drum 1 with a predetermined color developer, such as black and red, and a cleaning device 4 for cleaning the photosensitive drum 1 to remove the developer remaining on the surface of the photosensitive drum 1.

The apparatus comprises a rotatable or pivotable assembly 104 which contains the process cartridge K. The process cartridge K is detachably mounted into the rotatable assembly 104. The rotatable assembly 104 further comprises a light source 9 for illuminating an original to be copied, a condenser mirror 91, an array 10 of short focus imaging elements and other elements, which constitute an image exposure optical system. A stationary assembly comprises a transfer discharger 11, a transfer material feeding mechanism 12, an image fixing device 14 and other necessary elements. The stationary assembly has an upper surface on which a guiding rail 102 is fixed extending along the rear side of the apparatus. An original supporting platen or carriage 5 for supporting and reciprocating an original to be copied is reciprocably positioned and guided by the guiding rail 102 at the rear side. The original supporting carriage 5 includes a transparent plate 51 made of glass or plastic material and an original pressing plate hinged to cover and uncover the originally by pivoting movement in the direction of the arrow.

Thus, the original carriage 5 is correctly positioned and guided by the guiding rail 102 fixedly mounted on the top surface at the rear side of the apparatus. Preferably, the guiding rail 102 extends over substantially the entire length of the stationary assembly so as to insure the accuracy of movement of the original carriage 5. At the front side, the original carriage 5 is guided by a guiding rail 103A fixedly mounted to the rotatable assembly 104 and extending parallel to the guiding rail 102, so that the original carriage 5 can be moved while it is maintained at a correct position with respect to the rotatable assembly 104, whereby the distance from the original carrying surface of the original carriage 5 of the stationary assembly 100 and the imaging array 10 can be maintained constant while the original carriage 5 is being moved along the guide rail 102. The guiding rail 103A will be described in detail hereinafter.

At the rear side of the original carriage 5, a rack is fixedly mounted extending along the guide rail 102. The rack is meshed with a driving pinion rotatably mounted in the stationary assembly 100. The pinion is rotatably in forward and backward directions to reciprocably drive the original carriage 5.

In operation, the apparatus is maintained in the closed state shown in FIG. 1, and an original 6 to be copied is placed face down on the transparent plate 51 at a predetermined position, while the original pressing plate 52 is open, and then the original is covered and pressed by the pressing plate 52. When a copy button is depressed, the original carriage 5 starts to move, and the bottom surface of the original 6 is slit-scanned by passing by an original illuminating slit 8 during a forward or backward stroke of the original carriage 5 movement. Since the slit is illuminated by an illuminating lamp, an image of the bottom surface of the original formed by the short focus imaging element array 10 onto the surface of the photosensitive drum 1 which is rotating, so that the surface of the drum 1 is sequentially exposed to the moving image of the original. The subsequent process of forming a fixed image on a recording sheet may be of any well known type, and therefore detailed description is omitted for simplicity. The original carriage 5 is shown in FIG. 1 as being placed at its home position, where the stationary assembly 100 is completely covered by the original carriage 5. After the original scanning operation, the original carriage 5 returns to the home position.

As shown in FIG. 2, a mark 22 is formed on the original pressing plate 52 of the original carriage 5. Correspondingly, a mark 21 is formed on the top surface of the stationary assembly 100. When the original carriage 5 is moved leftward in those FIGS. and is positioned so that the mark 22 and the mark 21 are aligned, a releasing lever 105 and the top surface of the rotatable assembly 104 are exposed, although they have been covered by the original carriage 5 while the latter has been located at the home position. The releasing lever 105 is engaged with a locking member 106, which is engageable with a latch 107. The locking member 106 and the latch 107 are engaged when the apparatus is closed. When the releasing lever 105 is pulled upwardly, the locking member 106 is disengaged from the latch 107, and the spring biased rotatable assembly 104 rotates about the hinge 108 by an urging spring in the counter clockwise direction so that the rotatable assembly 104 is raised from the top surface 101 of the apparatus, as shown in FIG. 2. And, the rotatable assembly 104 is maintained at a predetermined open angle. When the rotatable assembly 104 is pushed down against the spring force sufficiently, the locking member 106 is engaged with the latch 107 so that the closed position is maintained.

The process carriage K can be mounted into or demounted from the rotatable assembly 104 when it is at the open position described above and shown in FIG. 2. More particularly, the process carriage K is guided toward the rear side along guiding rails 109 and 110 extending parallel with the hinge shaft 108 until it is positioned to a predetermined plates.

Thus, the rotatable assembly 104 can be opened with the original carriage 5 left in the stationary assembly 100. Therefore, the weight of the rotatable assembly 104 can be reduced, with the possibility of the original carriage 5 falling also thus being reduced.

Now, the guiding rail 103A extending parallel to the guide rail 102 and fixed on the top surface of the rotatable assembly 104, will be described referring to FIG. 5. The guiding rail 103A is fixedly mounted to the rotatable assembly 104 and extends at least beside the slit 8, as best seen in FIG. 3, and therefore, it is shorter than the guide rail 102. The guiding rail 103A also extends parallel to the direction of reciprocable movement of the original carriage 5.

Figure 5:
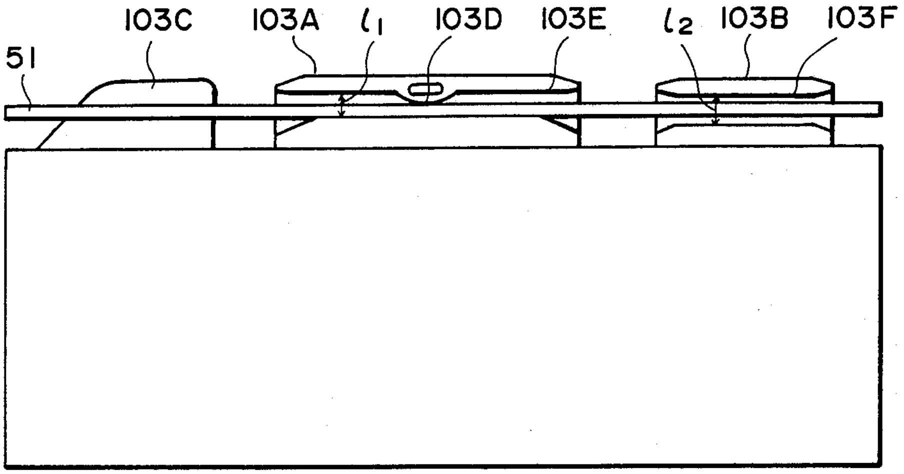
FIG. 5 is a rear view illustrating guiding means provided at a front side of the apparatus.

As best seen in FIG. 5, which is a rear view with the guide rail 102 and the mechanism therearound omitted, the guiding rail 103A has a slot having a projection 103D so that the transparent plate 51 contacts at its upper surface and lower surface with the projection 103D and the lower surface of the slot, whereby the top surface of the transparent plate 51 is correctly positioned in the vertical direction. It should be noted that the projection 103D is located substantially in alignment with the slit 8, and therefore the vertical position of the transparent glass 51 is maintained at a predetermined level at the slit position, which is the very position where the distance from the original to the short focus imaging element array 10 needs to be corrected, since the image reading is effected there. Also, it should be understood that the guiding rail 103A having the projection 103D is fixed to the rotatable assembly 104, which is the very assembly that contains the imaging element, since the top surface of the transparent glass 51 is directly positioned with respect to the imaging element, more particularly since the guide rail 103A is fixedly mounted on the assembly that contains the imaging element. It is now not necessary to expect that the top surface of the supporting glass is correctly positioned with respect to the imaging element on the ground that the assembly containing the imaging element is positioned with respect to the stationary assembly and that the original supporting surface is positioned with respect to the fixed assembly. In other words, the relative positioning between the imaging element and the original supporting surface is not effected by way of the stationary assembly, but is effected directly, according to this embodiment.

In this embodiment, the slit of the guiding rail 103A is larger outside the region of the slit 8 as shown in FIG. 5, and is larger than the thickness of the transparent plate 51 so as to insure the correct positioning at the slit region. The width of the slot is indicated by 11.

Additionally, in this embodiment the stationary assembly 100 is provided with a guiding rail 103B on top of the surface thereof. The guiding rail 103B is in alignment with the guiding rail 103A when the apparatus is closed. The guiding rail 103B has a slot for receiving the transparent plate 51. The slot is in alignment with the slot of guiding rail 103A, when the apparatus is closed, that is, the rotatable assembly 104 is in the closed position. The width $l_2$ is slightly larger than the width $l_1$, since the vertical position of the original supporting surface thereat hardly influence the imaging at the slit region. Thus, the original supporting surface of the transparent plate 51 is correctly positioned at the slit region by the projection 103D, and therefore load required for moving the original carriage 5 is minimized without deteriorating the positioning accuracy at the slit position.

The guiding rail 103B is constructed and placed to cantilever the original carriage 5 when it is located to the left for allowing opening of the rotatable assembly 104 as shown in FIGS. 2 and 3. However, the original carriage 5 may be supported only by the rear side guiding rail 102 which is suitably configured so as to cantilever the original carriage 5, although the provision of the guiding rail 103B is preferable to ensure the supporting and to guide the original carriage 5 into the guiding rail 103A of the rotatable assembly 104.

An upper surface 103F of the guiding rail 103B is slightly lower than the level of the upper surface 103E of the guiding rail 103. By means of this, even if the original carriage 5 is inclined when it is cantilevered as shown in FIGS. 2 and 3, the original carriage 5 is easily reengaged into the guiding rail 103A when it is returned toward the home position. Further, the ends of the slots of the guiding rails 103A and 103B are enlarged as best seen in FIG. 5 to facilitate the reengagement. The guiding rail 103A provides an additional advantage, which will be described.

Figure 4A:
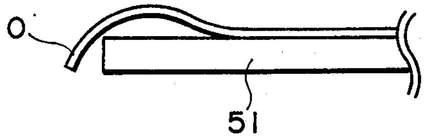
FIGS. 4A and 4B are sectional views of an original supporting platen, illustrating a state in which an original is supported thereon.

An original to be copied may sometimes be so large that a part thereof extends beyond the front edge of the apparatus toward the operator. In this case, the portion of the original extending beyond the front edge inclines downward, with the result that a part of the original is raised or spaced from the original supporting surface of the transparent plate, as shown in FIG. 4A. This spacing results in deterioration of the reading of the original.

Figure 4B:
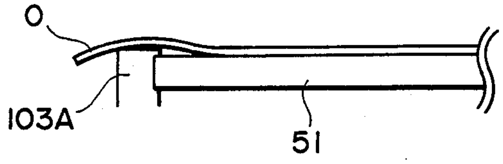

As shown in FIG. 4B, according to the present invention, the guiding rails 103A and 103B, particularly the guiding rail 103A are effective to solve this problem. More particularly, the top surface of the guiding rail 103A, and possibly the top surface of the guiding rail 103B, are effective to function as an extension of the transparent plate 51 to provide additional support to the original O, thus minimizing the original rise.

The top surface of each of the guiding rails 103A and 103B are inclined downwardly toward the ends as shown in FIG. 5 so as to allow the portion of the original extending beyond the front edge of the apparatus to be smoothly guided to the top surface of the guiding rails. The inclined portions are preferably formed at the upstream side thereof with respect to original scanning movement of the original carriage 5, although it is more preferably that the inclined portions are formed at both ends.

A projection 103C is formed on the top surface 101 of the stationary assembly 101. The projection 103C may be integrally formed with the top plate 101 of the stationary assembly 100. It is aligned with the guiding rails 103A and 103B.

Similarly to the guiding rails 103A and 103B, the top surface of the projection 103C is slightly higher than the top surface of the original supporting platen 51, whereby the original 0 is prevented from spacing from the original supporting surface of the platen 51 at the slit position and also at the downstream and upstream sides of the slit portion with respect to the scanning movement of the original carriage, whereby the reading accuracy of the original is further increased. In this embodiment, the projection 103C is not engageable with the original supporting carriage 5, and therefore it does not influence the accuracy of movement of the original carriage 5.

In this embodiment, the top surface of the guiding rail 103A is slightly higher than the levels of the top surfaces of the guiding rails 103B and the projection 103C. By means of this, the above-described function of the top surface of the guiding rail 103A is assured.

As will be understood, the guiding rail 103A is effective to maintain the correct distance between the original supporting surface of the original carriage 5 and the openable assembly 104, even if the apparatus is operated many times which may wear, the locking member 106 and the latch 107 may be worn. It should be noted that the guiding rail 103A is effective to correctly position the original supporting glass 51, since it confines the original supporting glass 51 at its front side which is the free side of the original supporting platen 51 and which is the side where is the guiding rail 103A is not provided, while the rear side is already securedly supported by the guiding rail 102. Therefore, the guiding rail 103A provides proper positioning where it is desirable.

The guiding rail 103A is not engaged with the original carriage 5, when the original carriage is in its retracted position as shown in FIGS. 2 and 3. As described hereinbefore, when it is at the retracted position, the original carriage 5 is supported by the guiding rail 102 and additionally by the guiding rail 103B in this embodiment.

Now, operations of the embodiment will be described with respect to opening and closing of the openable assembly 104. When the inside of the apparatus is to be inspected, when a jammed sheet is to be disposed of, when the process cartridge K is to be replaced or interchanged, or the like, the original carriage 5 is moved leftward above the top plate 101 of the stationary assembly 100 along the guiding rails 102, 103A and 103B as far as the top plate of the rotatable assembly 104 in the top plate 101 of the stationary assembly 100 is sufficiently exposed as shown in FIG. 3, and more particularly is moved far enough for the marks 22 and 21 to come into alignment with each other. Then, the original supporting plate 5 is disengaged from the guiding rail 103A of the rotatable assembly 104; however, the original carriage 5 is still engaged with the guiding rail 102, and additionally with the guiding rail 103B in the embodiment.

Subsequentially, the lever 105 is pulled up so as to disengage the locking member 106 from the latch 107, and the rotatable assembly 104 is opened as shown in FIG. 2.

After completion of the required operations or servicing, the assembly 104 is pushed down against the urging spring force until the locking member 106 is engaged with the latch 107. Then, the closed position is maintained. Then, the original carriage 5 is moved rightwardly. During this movement, the original carriage 5 is maintained engaged with the guiding rail 103B. Since the guiding rail 103B fixed on the stationary assembly is substantially in alignment with the guiding rail 103A fixed on the openable assembly 104 when it is closed, the original carriage 5 is smoothly engaged into the guiding rail 103A so as to allow the original carriage 5 to be returned to its home position.

Thus, the original supporting surface of the original carriage 5 is correctly positioned with respect to the movable assembly 104 containing an imaging element. Further, the provision of the additional guiding rail 103B on the stationary assembly 100 on a top surface thereof at its side where the original carriage 5 is present when the original carriage 5 is retracted, is effective to ensure the supporting of the original carriage 5 when it is at the retracted position and is also effective to ensure the guiding of the original carriage 5 into the guiding rail 103A.

In the foregoing description of the embodiment, the member on which an image of the original is formed through the imaging element is a photosensitive member on which an electrostatic latent image is formed in a known process. However, this detail is not necessary and the photosensitive member may be replaced by another image reading device, such as a charge coupled device (CCD).

While the invention has been described with reference to the structures disclosed herein, it is not confined to the details set forth and this application is intended to cover such modifications or changes as may come within the purposes of the improvements or the scope of the following claims.

What is claimed is:

1. An image forming apparatus for forming an image of an original using as optical image of the original, said apparatus comprising:

a first assembly;

a second assembly cooperable with said first assembly, said second assembly being movable relative to said first assembly between a closed position wherein said apparatus is operable and an open position wherein said apparatus is opened;

a reciprocable original supporting member for supporting an original;

a first guide member on said first assembly, for guiding reciprocating movement of said original supporting member adjacent one of such sides of said original supporting member as are parallel to a direction of the reciprocating movement;

optical means, in said second assembly, for forming the image of the original supported on said original supporting member;

a second guiding member, on said second assembly, for guiding and positioning said original supporting member adjacent another of said sides of said original supporting member, wherein said original supporting member is movable to be disengaged from said second guiding member when said second assembly is to be moved said open position, said second guiding member being contactable with said original supporting member to correctly position said original supporting member with respect to said second assembly when it is engaged with said original supporting member, whereby said second guiding member is effective to correctly position said original supporting member with respect to said optical means, while allowing disengagement of said original supporting member therefrom.

2. An apparatus according to claim 1, wherein said first guiding member has a length which is substantially the same as a length of said apparatus in the direction of the reciprocating movement, and wherein said second guiding member has a length shorter than the length of said apparatus.

3. An apparatus according to claim 1, wherein said optical means include an array of short focus imaging elements.

4. An apparatus according to claim 1, wherein said second assembly is movable upward to assume said open position, and wherein said original supporting member is capable of assuming a home position wherein an upper part of said second assembly is completely covered and is capable of assuming a retracted position wherein said upper part of said second assembly is exposed to allow said second assembly to be moved upward.

5. An apparatus according to claim 4, further comprising mark means indicating said retracted position of said original supporting member.

6. An apparatus according to claim 5, wherein said mark mean comprises a reference index on said original supporting member and a reference index on said first assembly, and wherein, when said indexes are aligned, said original supporting member assumes said retracted position.

7. An apparatus according to claim 4, further comprising a movable lever for allowing said second assembly to be moved to said open position, said lever being located at such a position that when said original supporting member is at said home position, said lever is covered by said original supporting member, and when said original supporting member is at said retracted position, said lever is allowed to be moved.

8. An apparatus according to claim 1, wherein said second assembly further includes an exposure slit through which the optical image is formed, said second guiding member is located adjacent said slit to be crossed by an extension of a longitudinal axis of said slit.

9. An apparatus according to claim 1, wherein said second guiding member has a top surface having an end portion inclined downwardly.

10. An apparatus according to claim 1, wherein said first guiding member has a length which is substantially the same as a length of the apparatus in said direction of the reciprocating movement.

11. An image forming apparatus for forming an image of an original using an optical image of the original, said apparatus comprising:

a first assembly;

a second assembly cooperable with said first assembly, said second assembly being movable relative to said first assembly between an upper position and a lower position;

a reciprocable original supporting member for supporting an original along a path interferable with said second assembly located at upper open position;

a first guiding member on said first assembly, for guiding reciprocating movement of said original supporting member;

optical means, in said second assembly, for forming the image of the original supported on said original supporting member; and a second guiding member, on said second assembly, for guiding and positioning said original supporting member, wherein said original supporting member is movable to be disengaged from said second guiding member, said second guiding member being in substantial alignment with said first guiding member in a direction of the reciprocating movement when said second assembly is at said lower position, and said second guiding member being contactable with said original supporting member to correctly position said original supporting member with respect to said second assembly when it is engaged with said original supporting member, whereby said second guiding member is effective to correctly position said original supporting member with respect to said optical means, while allowing disengagement of said original supporting member therefrom.

12. An apparatus according to claim 11, further comprising mark means indicating said retracted position of said original supporting member.

13. An apparatus according to claim 12, wherein said mark means comprises a reference index on said original supporting member and a reference index on said first assembly, and wherein, when said indexes are aligned, said original supporting member assumes said retracted position.

14. An apparatus according to claim 11, further comprising a movable lever for allowing said second assembly to be moved to said open position, said lever being located at such a position that when said original supporting member is at said home position, said lever is covered by said original supporting member, and when said original supporting member is at said retracted position, said lever is allowed to be moved.

15. An apparatus according to claim 11, wherein said second assembly further includes an exposure slit through which the optical image is formed, said second guiding member being located adjacent slit to be crossed by an extension of a longitudinal axis of said slit.

16. An apparatus according to claim 15, wherein said first and second guiding members have respective guiding slots for guiding said original supporting member, said slot of said first guiding member having a slot width larger than that of said second guiding member.

17. An apparatus according to claim 11, wherein said optical means includes an array of short focus imaging elements.

18. An apparatus according to claim 11, wherein said second guiding member has a top surface having an end portion inclined downward.

19. An apparatus according to claim 18, wherein said inclined portion is formed at least adjacent such an end of said second guiding member as is nearer to said first guiding member.

20. An apparatus according to claim 11, wherein said first guiding member has an end portion in the direction of the reciprocating movement, which end portion has a top surface inclined downward.

21. An apparatus according to claim 20, wherein said inclined portion is formed at least adjacent such an end of said first guiding member is nearer to said second guiding member.

22. An image forming apparatus for forming an image of an original using an optical image of the original, said apparatus comprising:

a first assembly;

a second assembly cooperable with said first assembly, said second assembly being movable relative to said first assembly between an upper position and a lower position;

an original supporting member for supporting an original, said original supporting member being reciprocable in a range including a home position wherein it interferes with movement of said second assembly toward said upper position and a retracted position wherein it does not interfere with movement of said second assembly toward said upper position;

a limiting member on said first assembly, for limiting said original supporting member by contacting an upper surface of said original supporting member when said original supporting member is at said retracted position;

optical means, in said second assembly, for forming the image of the original supported on said original supporting member; and a guiding member on said second assembly, for guiding and positioning said original supporting member, wherein said original supporting member is disengaged from said guiding member when said original supporting member is at said retracted position, said guiding member being contactable with said original supporting member with respect to said second assembly when it is engaged with said original supporting member.

23. An apparatus according to claim 22, wherein said limiting member and guiding member are substantially aligned in a direction of the reciprocating movement.

24. An apparatus according to claim 22, wherein said second assembly further includes an exposure slit through which the optical image is formed, said guiding member being located adjacent said slit to be crossed by an extension of a longitudinal axis of said slit.

25. An image forming apparatus for forming an image of an original using an optical image of the original, said apparatus comprising:

a first assembly;

a second assembly cooperable with said first assembly, said second assembly being movable relative to said first assembly between an upper position and a lower position;

an original supporting member for supporting an original, said original supporting member being reciprocal in a range including a home position wherein it interferes with movement of said second assembly toward said upper position and a retracted position wherein it does not interfere with movement of said second assembly toward said upper position;

optical means, in said second assembly, for forming the image of the original supported on said original supporting member, wherein said second assembly is capable of accommodating a process cartridge containing as a unit a photosensitive member on which the optical image of the original is formed and at least one process means able to act on the photosensitive member, said process cartridge being mountable into said second assembly when said second assembly is at said upper position; and a guiding member on said second assembly, for guiding and positioning said original supporting member, wherein said original supporting member is disengaged from said guiding member when said original supporting member is at said retracted position, said guiding member being contactable with said original supporting member to correctly position said original supporting with respect to said second assembly when it is engaged with said original supporting member.

26. An apparatus according to claim 25, wherein said optical means includes an array of short focus imaging elements.

27. An apparatus according to claim 25, further comprising as additional guiding member provided on said first assembly, which is in alignment with said first mentioned guiding member in a direction of the reciprocating movement when said second assembly is at said lower position.

28. An apparatus according to claim 25, further comprising a limiting member on said first assembly for limiting said original supporting member by contacting an upper surface of said original supporting member when it is at said retracted position.

29. An image reading device, comprising: a main assembly having optical means for reading an original;

an original supporting member for supporting an original to be read, said original supporting member being provided movably above said main assembly;

a first guiding member on said main assembly, said first guiding member extending parallel to a direction of movement of said original supporting member adjacent one of such sides of said supporting member as are parallel to the direction of the movement of said original supporting member;

a second guiding member on said main assembly, for guiding in a guiding line and positioning said original supporting member;

a projection formed on said main assembly, which is located substantially in alignment with said second guiding member with respect to the guiding line; and an openable cover for covering the original on said original supporting member, said projection being disposed adjacent a side where said cover is opened and closed.

30. A device according to claim 29, wherein said projection has an end portion having a top surface inclined downwardly with respect to the direction of the movement of said original supporting member.

31. An image forming apparatus for forming an image of an original, said apparatus comprising:

a first assembly;

a second assembly cooperable with said first assembly, said second assembly being movable relative to said first assembly between a closed position wherein said apparatus is operable and an open position wherein said apparatus is opened;

an original supporting member for supporting an original, said original supporting member being reciprocable in a first range wherein it interferes with movement of said second assembly and in a second range wherein it allows the movement of said second assembly;

a first guiding member, on said first assembly, for guiding reciprocating movement of said original supporting member adjacent a side of the original supporting member both in said first and said second range; and a second guiding member, on said second assembly adjacent another side of said original supporting member along a path of said original supporting member to engage with said original supporting member, to guide and position said original supporting member relative to said second assembly in at least a part of said first range and to disengage from said original supporting member to allow movement of said second assembly in said second range.

32. An image reading device, comprising:

a main assembly having optical means for reading an original;

an original supporting member for supporting an original to be read, said original supporting member being provided movably above said main assembly;

a first guiding member on said main assembly, said first guiding member extending parallel to a direction of movement of said original supporting member adjacent one of such sides of said supporting member as are parallel to the direction of the movement of said original supporting member;

a second guiding member on said main assembly, for guiding in a guiding line and positioning said original supporting member; and a projection formed on said main assembly, which is located substantially in alignment with said second guiding member with respect to the guiding line, said projection not being engageable with said original supporting member.

33. An image reading device, comprising:

a main assembly having optical means for reading an original;

an original supporting member for supporting an original to be read, said original supporting member being provided movably above said main assembly;

a first guiding member on said main assembly, said first guiding member extending parallel to a direction of movement of said original supporting member adjacent one of such sides of said supporting member as are parallel to the direction of the movement of said original supporting member;

a second guiding member on said main assembly, for guiding in a guiding line and positioning said original supporting member; and a projection formed on said main assembly, which is located substantially in alignment with said second guiding member with respect to the guiding line, said projection having a height slightly lower than that of said second guiding member.

34. An image reading device, comprising:

a main assembly having optical means for reading an original;

an original supporting member for supporting an original to be read, said original supporting member being provided movably above said main assembly;

a first guiding member on said main assembly, said first guiding member extending parallel to a direction of movement of said original supporting member adjacent one of such sides of said supporting member as parallel to the direction of the movement of said original supporting member;

a second guiding member on said main assembly, for guiding in a guiding line and positioning said original supporting member; and a projection formed on said main assembly, which is located substantially in alignment with said second guiding member with respect to the guiding line, wherein said main assembly is separable into first and second assemblies, and wherein said first guiding member is provided on said first assembly and said second guiding member is provided on said second assembly.

35. A device according to any one of claims 32, 33 or 34 wherein said projection is disposed downstream of said second guiding means with respect to the movement direction of said original supporting member.

36. A device according to any one of claims 32, 33, or 34 wherein said projection is disposed outside said original supporting member in a direction perpendicular to the movement direction of said original supporting member.

37. A device according to claim 34, wherein said second assembly contains said optical means.

38. A device according to claim 37, wherein said projection is provided on said first assembly.

* * * * *

UNITED STATES PATENT AND TRADEMARK OFFICE
CERTIFICATE OF CORRECTION

PATENT NO. : 4,875,075 Page 1 of 4
DATED : October 17, 1989
INVENTOR(S) : Sumitoshi Sootome, et al.

It is certified that error appears in the above-identified patent and that said Letters Patent is hereby corrected as shown below:

TITLE PAGE,
[57] ABSTRACT:

Line 4, "assembly the" should read --assembly, the--.

Line 13, "support" should read --supporting--.

COLUMN 1:

Line 10, "of" should read --or--.

Line 16, "separate" should read --separated--.

Line 34, "should be" should read --should be left in--.

Line 35, "be" should read --by--.

Line 40, "tional" should read --tion--.

Line 42, "Tadyayuki" should read --Tadayuki--.

Line 44, "No. 8608/1986." should read --88608/1986.--.

COLUMN 3:

Line 31, "rotatably" should read --rotatable--.

UNITED STATES PATENT AND TRADEMARK OFFICE

CERTIFICATE OF CORRECTION

PATENT NO. : 4,875,075

DATED : October 17, 1989

INVENTOR(S) : Sumitoshi Sootome, et al.

It is certified that error appears in the above-identified patent and that said Letters Patent is hereby corrected as shown below:

COLUMN 4:

Line 4, "wardly," should read --ward,--.

Line 49, "corrected," should read --correct,--.

COLUMN 5:

Line 1, "slit" should read --slot--.

Line 5, "11." should read --$\underline{l}_1$--.

Line 7, "on top" should read --on the top--.

Line 8, "of the" should be deleted.

Line 41, "FIG. 5" should read --FIG. 5,--.

COLUMN 6:

Line 1, "preferably" should read --preferable--.

Line 63, "the" (second occurrence) should read --this--.

Line 65, "subsequentially," should read --subsequently,--.

UNITED STATES PATENT AND TRADEMARK OFFICE

CERTIFICATE OF CORRECTION

PATENT NO. : 4,875,075

DATED : October 17, 1989

INVENTOR(S) : Sumitoshi Sootome, et al.

It is certified that error appears in the above-identified patent and that said Letters Patent is hereby corrected as shown below:

COLUMN 7:

Line 41, "as" should read --an--.

Line 51, "first guide member" should read --first guiding member--.

Line 65, "moved said" should read --moved to said--.

COLUMN 9:

Line 45, "adjacent slit" should read --adjacent said slit--.

COLUMN 10:

Line 1, "is" should read --as is--.

COLUMN 11:

Line 10, "supporting" should read --supporting member--.

Line 17, "as" should read --an--.

UNITED STATES PATENT AND TRADEMARK OFFICE

CERTIFICATE OF CORRECTION

PATENT NO. : 4,875,075 Page 4 of 4

DATED : October 17, 1989

INVENTOR(S) : Sumitoshi Sootome, et al.

It is certified that error appears in the above-identified patent and that said Letters Patent is hereby corrected as shown below:

COLUMN 13:

Line 1, "as" should read --as are--.

Signed and Sealed this

Twentieth Day of August, 1991

*Attest:*

HARRY F. MANBECK, JR.

*Attesting Officer*

*Commissioner of Patents and Trademarks*